United States Patent
Lipscomb et al.

(10) Patent No.: US 7,346,687 B2
(45) Date of Patent: Mar. 18, 2008

(54) GUI DRIVING MEDIA PLAYBACK DEVICE

(75) Inventors: Kenneth O. Lipscomb, Marietta, GA (US); John B. Petritis, Lawrenceville, GA (US); Richard D. Robison, Decatur, GA (US); Kelly P. Morrison, Atlanta, GA (US); Michael D. Hirsch, Atlanta, GA (US); Eric Neal Muntz, Marietta, GA (US); John Paul Whitehead, III, Atlanta, GA (US)

(73) Assignee: ZapMedia Services, Inc., Atlanta, GA (US)

( * ) Notice: Subject to any disclaimer, the term of this patent is extended or adjusted under 35 U.S.C. 154(b) by 0 days.

(21) Appl. No.: 11/420,234

(22) Filed: May 25, 2006

(65) Prior Publication Data

US 2006/0206493 A1 Sep. 14, 2006

Related U.S. Application Data

(60) Division of application No. 11/162,716, filed on Sep. 20, 2005, which is a continuation of application No. 09/679,688, filed on Oct. 5, 2000, now Pat. No. 7,020,704.

(60) Provisional application No. 60/177,783, filed on Jan. 24, 2000, provisional application No. 60/177,884, filed on Jan. 24, 2000, provisional application No. 60/177,867, filed on Jan. 24, 2000, provisional application No. 60/176,833, filed on Jan. 19, 2000, provisional application No. 60/177,063, filed on Jan. 19, 2000, provisional application No. 60/176,830, filed on Jan. 19, 2000, provisional application No. 60/176,829, filed on Jan. 19, 2000, provisional application No. 60/157,736, filed on Oct. 5, 1999.

(51) Int. Cl.
*G06F 15/173* (2006.01)
*G06F 9/00* (2006.01)

(52) U.S. Cl. .................. 709/226; 709/229; 707/10; 715/716

(58) Field of Classification Search ............. 709/223, 709/224, 226, 229; 713/2; 715/716, 730; 707/10, 100
See application file for complete search history.

(56) References Cited

U.S. PATENT DOCUMENTS 5,231,511 A * 7/1993 Kodama et al. ............ 386/118
5,613,092 A * 3/1997 Lim et al. ................... 710/301

(Continued)

FOREIGN PATENT DOCUMENTS

| EP | 0 982 732 A1 * | 1/2000 |
|----|----------------|--------|
| JP | 405167590 A * | 7/1993 |

(Continued)

OTHER PUBLICATIONS

Software Control of Multimedia Device Interconnection, IBM TDB, Hancock, et. al. IPCOM000106113D, Sep. 1, 1993, v36, n9B, p. 569-572.*

*Primary Examiner*—Zarni Maung
(74) *Attorney, Agent, or Firm*—Smith Frohwein Tempel Greenlee Blaha, LLC; Gregory Scott Smith (57) ABSTRACT

A system and method for distributing digital media assets to a plurality of users. A portal is provided comprising at least one server computer. The portal executes a media library database server application that manages access a master library of media 5 assets that can be accessed by users via one or more communication networks. A plurality of media player devices communicate with the portal to access media assets for use. Each media player device may comprise a processor that executes a database client application that manages media assets licensed for use by a user.

15 Claims, 11 Drawing Sheets

U.S. PATENT DOCUMENTS

| | | | |
|---|---|---|---|
| 5,631,850 A * | 5/1997 | Tanaka et al. | 702/122 |
| 6,167,441 A * | 12/2000 | Himmel | 709/217 |
| 6,345,256 B1 * | 2/2002 | Milsted et al. | 705/1 |
| 6,963,920 B1 * | 11/2005 | Hohmann et al. | 709/230 |
| 7,020,704 B1 * | 3/2006 | Lipscomb et al. | 709/226 |

FOREIGN PATENT DOCUMENTS

| | | | |
|---|---|---|---|
| JP | 406169435 A * | 6/1994 |
| JP | 406180927 A * | 6/1994 |
| JP | 408032892 A * | 2/1996 |
| JP | 408167228 A * | 6/1996 |

\* cited by examiner

GUI DRIVING MEDIA PLAYBACK DEVICE

CROSS-REFERENCE TO RELATED APPLICATIONS

This application is a divisional of U.S. patent application Ser. No. 11,162,716 filed on Sep. 20, 2005, which is a continuation of U.S. patent application Ser. No. 09/679,688 filed Oct. 5, 2000, issued as U.S. Pat. No. 7,020,704 on Mar. 28, 2006, which claims the benefit of the priority of U.S. Provisional Patent Application Nos. 60/157,736 filed Oct. 5, 1999; 60/176,833 filed Jan. 19, 2000; 60/177,063 filed Jan. 19, 2000; 60/177,783 filed Jan. 24, 2000; 60/177,884 filed Jan. 24, 2000; 60/176,830 filed Jan. 19, 2000; 60/176,829 filed Jan. 19, 2000; and 60/177,867 filed Jan. 24, 2000. The entirety of each of these non-provisional and provisional applications is incorporated herein by reference.

BACKGROUND OF THE INVENTION

The distribution of music, video, software and other media assets has been dramatically transformed by the digital age and the Internet. For example, distribution of music is evolving from a physical copy sold by retail stores, catalog companies or on-line vendors, to digital copies transmitted over the Internet. In this connected and digital world, a system and method are needed whereby users can use media assets from multiple devices without the need to carry the asset on a memory device. It is desirable to provide a system and method that allows for the portability of media assets across different devices that are capable of connecting to a source of the media assets directly or indirectly over one or more communications networks.

BRIEF SUMMARY OF THE INVENTION

Briefly, the present invention is directed to a system and method for distributing digital media assets to a plurality of users. A portal is provided comprising at least one server computer. The portal executes a media library database server application that manages access to a master library of media assets that can be accessed by users via one or more communication networks. Each of a plurality of media player devices communicates with the portal to access media assets for use. Each media player device assists in managing media assets licensed for use by a user. The present invention is more fully described in the following description taken in conjunction with the accompanying drawings.

DETAILED DESCRIPTION OF THE INVENTION

Figure 1:
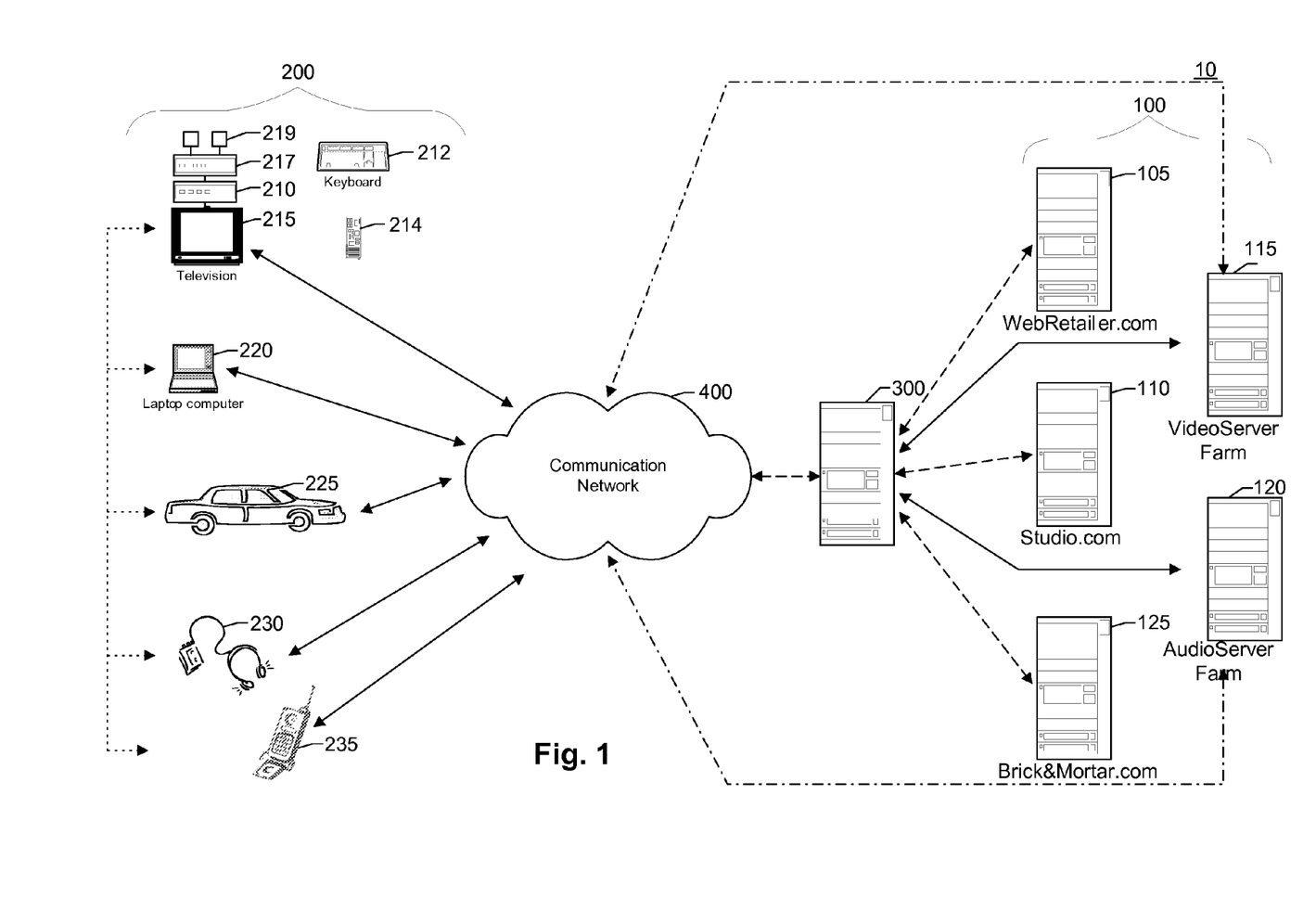
FIG. 1 is an overall block diagram of the system according to the present invention.
Figure 2:
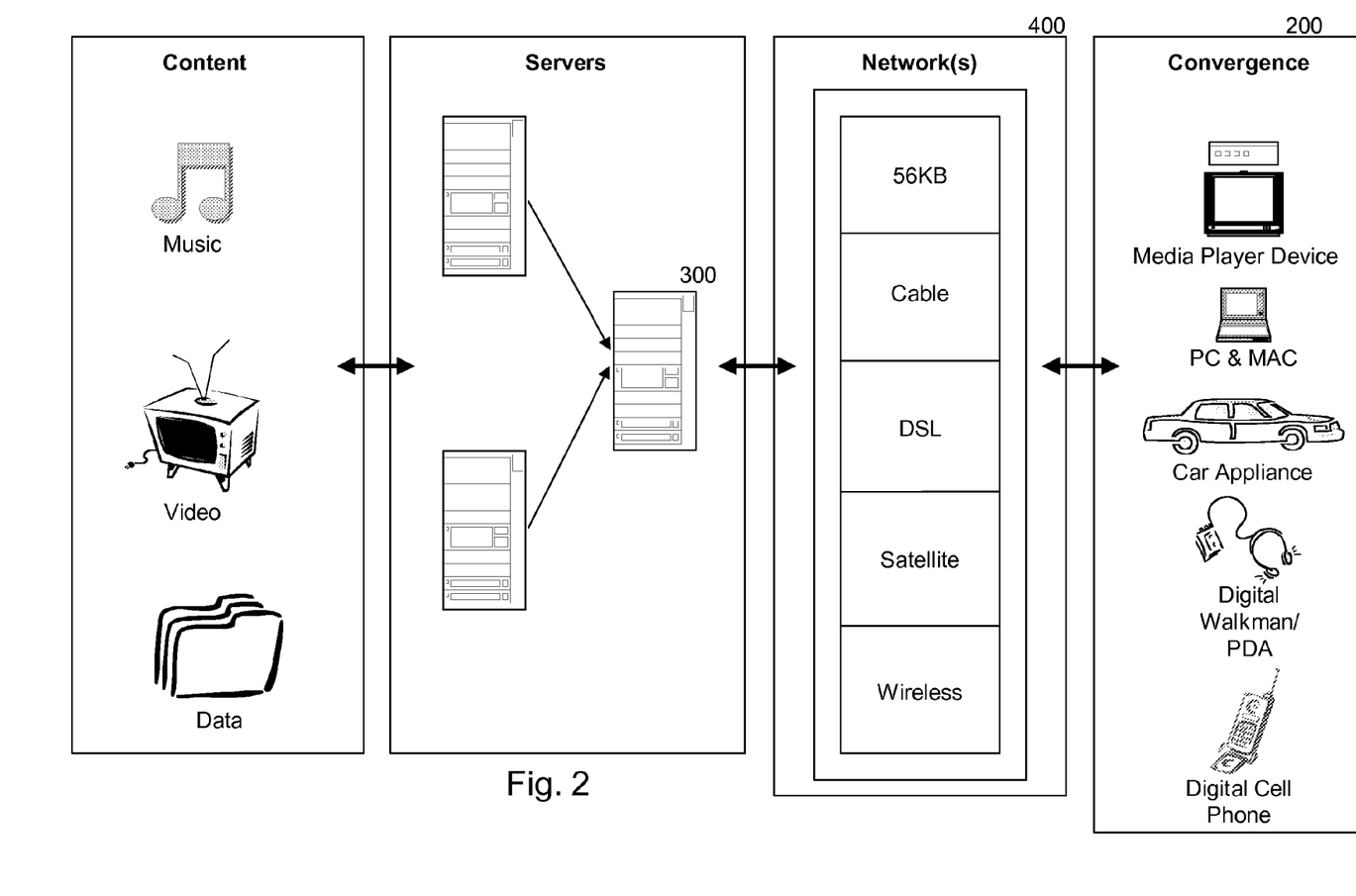
FIG. 2 is a block diagram depicting the flow of media asset data according to the present invention.

Referring to FIGS. 1 and 2, the present invention is directed to a system 10 for distributing digital media assets from a variety of media sources 100 to a variety of media player devices 200 through a portal 300. Examples of media sources 100 are a webretailer 105, a music or video production or distribution studio 110, a video server 115 containing a library of video assets such as movies and other video productions from one or more production companies, an audio server 120 containing a library of audio assets such as music and other audio productions from one or more record companies and a web site 125 for an online and/or brick&mortar media asset company. In addition, artists not affiliated with a mainstream production company may make their video and/or audio assets available from a host server or their own servers. The portal 300 connects to the media asset sources 100 by any suitable means, such as the Internet, dedicated telecommunication lines, wireless networks, dedicated wide area networks, or any combination thereof. The terminology "electronically transmitting" a digital media asset is meant to include wired and/or fiber communication, wireless communication, and any long-distance or short range communications (IEEE 802.11, HomeRF, BlueTooth™) or combinations thereof. In addition to downloading or streaming media assets stored locally to the portal 300, the portal 300 connects to media asset sources 100 and downloads and/or streams media assets from those sources to media player devices 200.

A media player device 200 is a device that enables a user to play a digital media asset. The media player device 200 may be a home consumer device 210 that connects to a television or other monitor 215 as well as a home stereo 217 (amplifier/tuner, etc.) 20 which in turn is connected to speakers 219, a personal computer (PC) 220 (laptop or desktop), a vehicle-based electronic device 225, a portable media player device 230, or a wireless electronic device 235. The media player is also referred to as a client media player insofar as it acts as a client to the portal 300 in some circumstances. An example of still another type of media player is a cable set-top box.

Briefly, a media player device 200 comprises a processor that executes a media playback software application program (or alternatively hardware) to enable a user to play or use a digital media asset, such as music, video, games, etc. In addition, the media player device 200 may have a display (LCD or other type), speakers, microphone, etc. The media playback software application program may be a platform generic software program that is useful on a diverse variety of media player devices. The media player device 200 of the home consumer device 210 variety may resemble a consumer electronics DVD player, that also connects to the Internet via broadband and/or modem. A broadband connection affords the ability of the media player device 200 to download audio and video media assets at desirable rates. The user interface with the home consumer device 210 is by way of a wired or (infrared or RF) wireless keyboard 212 and/or a handheld (infrared or RF) wireless remote 214. The details of one example of a media player device 200 are described hereinafter in conjunction with FIGS. 5-7.

A user may have multiple media player devices 200 and therefore desire access to media assets that he/she has purchased the rights to, on each media player, if that user has purchased rights of sufficient scope to permit access on multiple media players. Those assets to which a user has purchased digital access rights on one or more media players are hereinafter referred to as a user's licensed assets. Moreover, multiple users within a "family" may have different levels of access to certain classes of media assets on one or more media players 200 in that user family. Each user within the user family would have his/her own identifier and password. For example, an adult user might have access to certain "R" rated videos, while a child user might have access to only "G" rated videos. Some media assets may be licensed royalty free to a user such that there is no need to track how a user uses that particular media asset. The portal 300 is a computer server or group of servers that functions to allow for the storage, stream and download of media assets to a media player 200. In addition, as described above the portal 300 provides connections to other source sites, such as sources of streaming Internet radio providers.

The portal 300 allows for synchronization and replication of a user's licensed assets with each of the user's media player devices 200. This functionality is hereinafter referred to as the virtual media asset library. The portal 300 also serves as a central repository within which media assets are "tagged" with identity and access privileges of those users (and users within a user family) that have licensed rights in the media assets. The portal 300 may be accessible directly from a media player device and through one or more web sites and may provide a customizable interface or view to each user, if desired. The virtual media asset library technology may include rights management, watermarking, encryption and containment functions performed by the portal 300.

The digital media assets distributed by the system 10 may be audio such as music, video such as movies, television programs or other video productions, interactive software games, or any media that is digitized and suitable for electronic distribution. The digital media asset may be protected, where applicable or necessary, from piracy by the use of various methods, including digital rights asset management (DRM), encryption and watermarking. The digital media assets may be in any known or hereinafter developed formats, such as, for example, MP3, EPAC, WAV, REAL, MPEG, QuickTime and other formats.

The Portal

The portal 300 communicates with media player devices 200 via communication network 400 that may consist of the Internet and/or a combination of wireless communication networks, such as cellular networks, PCS networks, etc. While a single portal 300 is shown in FIG. 1, it should be understood that there may be multiple portals, each dedicated to serve subsets of media player devices in a distributed fashion so as to minimize load on individual servers.

Figure 3:
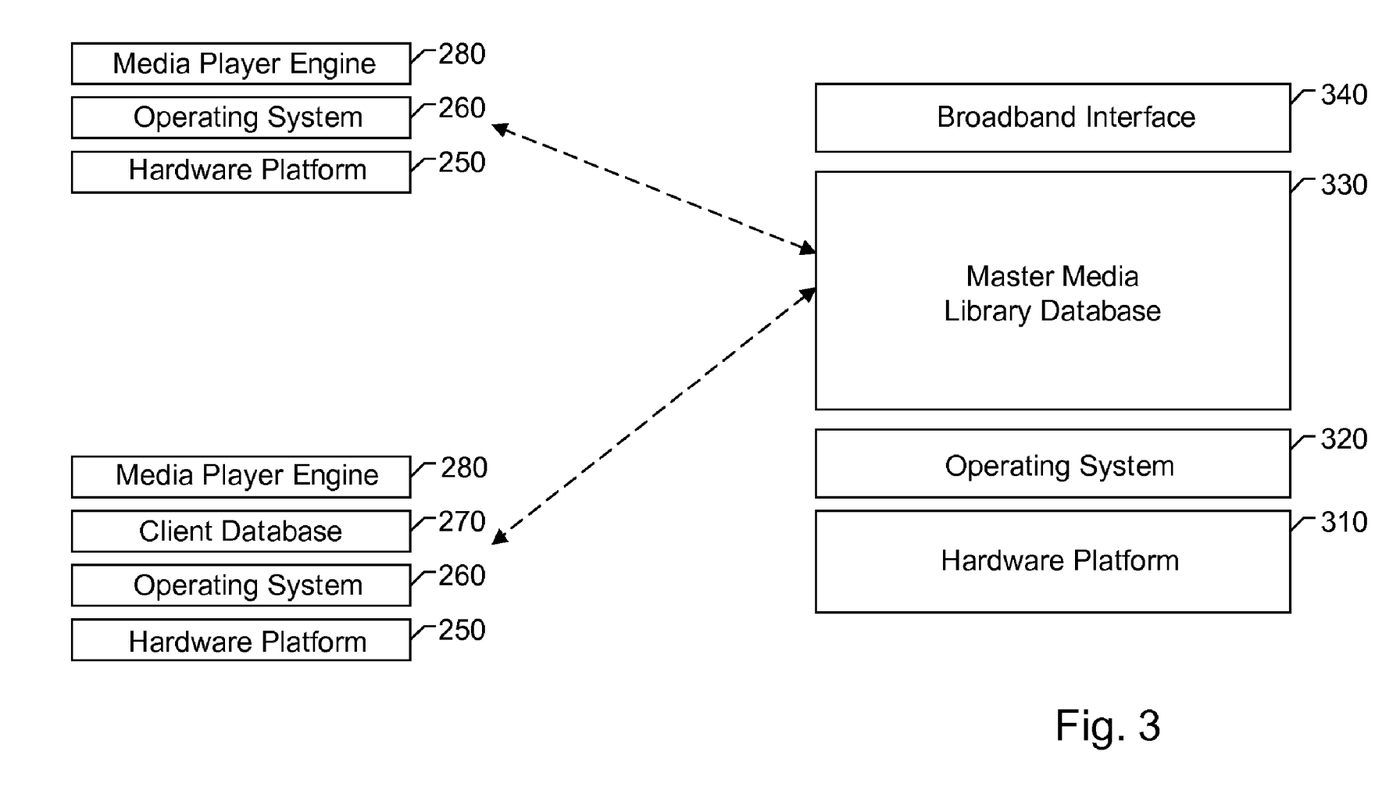
FIG. 3 is a block diagram depicting the interaction of various software components in the system.
Figure 4:
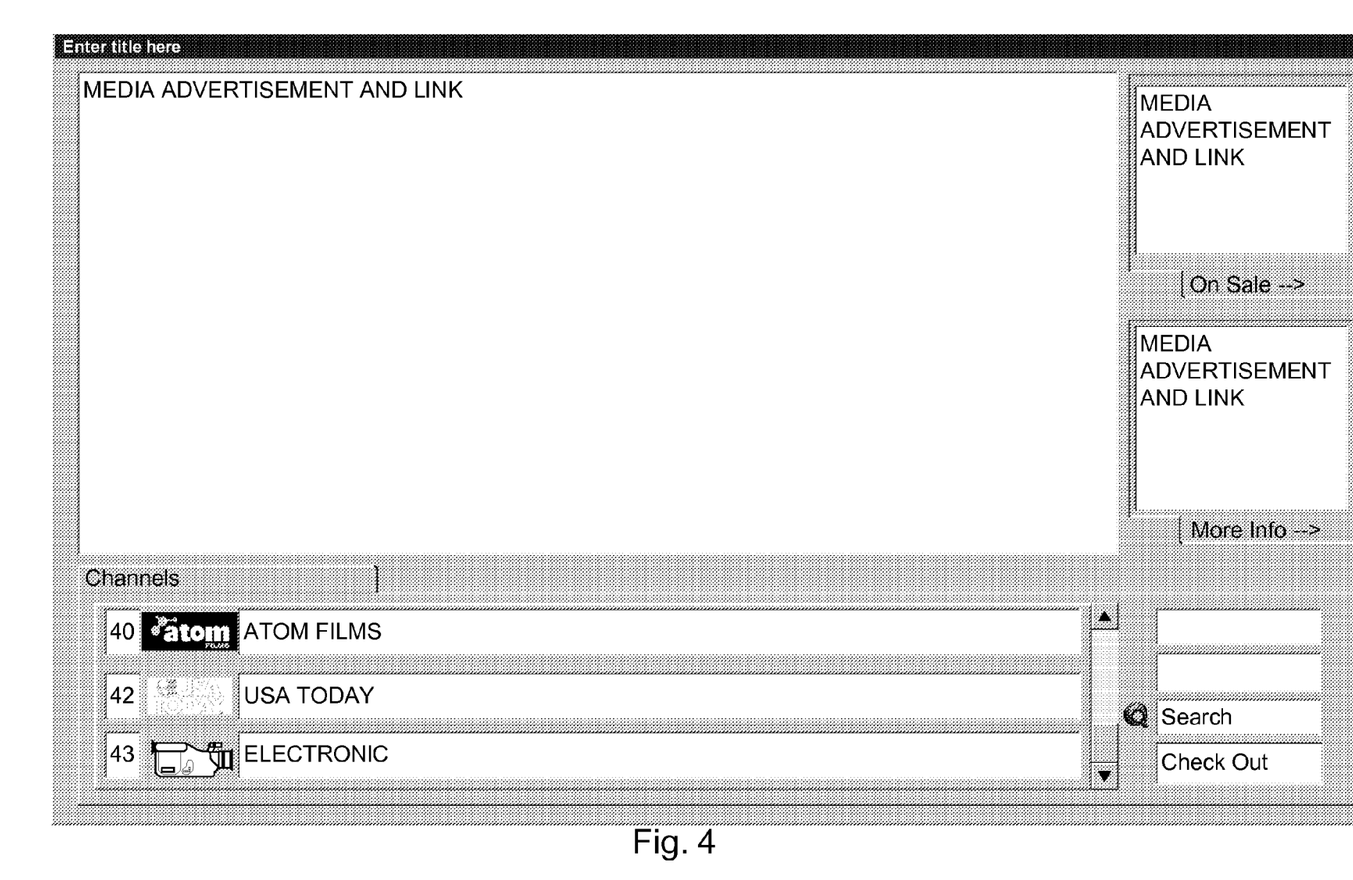
FIG. 4 is an example of a main screen or home page for the portal.

With reference to FIG. 3, a basic architecture for the portal 300 is described. The components of the portal 300 are a hardware platform 310, such as one or more computer servers, an operating system 320 that is executed by the hardware platform 310, a master media library database (server) application 330 and a broadband interface 340. An example of a web site home page through which a user interacts with the portal 300 is shown in FIG. 4. In this exemplary screen, there are several areas for advertisements, one or more of which are "hot" and thus provide a link to an advertiser site. In addition, there are channels on the bottom portion of the screen associated with various media sources.

In accordance with one aspect of the invention, the master media library database application 330 synchronizes the licensed digital media assets for a user with the client database application in each media player of the user so that a user can access any licensed media asset from any of the user's media players for which that user has licensed rights. Alternatively, for media players that do not have a database client application, the master database application 330 maintains the user's database of assets "on-line" and a user obtains access to it by connecting to the portal 300. This process is explained further hereinafter.

There are numerous other functions performed by the portal 300 and these are described below.

Update User and Billing Information

To begin with, the portal manages user information, such as name, address and phone information, billing and price plans and billing views desired by a user. There may be a monthly subscription charge and additional charges for the media assets a user desires to use.

Subscription Management Preferences

This portal allows the user to create their own custom portal view which previews and presents content that might fit the user's infotainment profile. Examples of these preferences are types of movies, producer, director, cinematographer, choreographer, actor/actress, music type, musician or artist, etc.

Content Management

Some or all of the user's licensed assets are catalogued and stored by the master media library database in the portal 300. (It should be understood that the media player device itself has storage capability to locally store assets.) There are numerous features associated with this aspect of the system. The portal 300 may be used to add, edit, or delete a user in an account. It may be used to create, edit, or delete a playlist of assets, as well as add or delete particular audio or video assets.

The portal may be used to edit the metadata associated with an asset (e.g., edit the title, artist genre classification of a song or the title, actor's name or director of a movie).

Asset Acquisition

There are a variety of functions and capabilities provided by the system associated with the process of acquiring assets, such as those listed below.

Stream Asset
Download Asset
Find/Search Master Database
Get Usage History
Set Access Privileges—time, date, type, rating, number, etc.
Check account status—active, limited, etc.
Log activity—detailed request database
Log Errors per user
Log Errors per title
Royalty Management Artists and media asset sources/distributors can interface to the portal to review usage activity of their respective media assets, including information such as, total downloads, downloads by type, downloads by region, and downloads by country. Royalties are calculated automatically and the billing system is queued for automatic payment, with specific approval being an option.

Interactive Services
Email:

Send & Receive Email
Third-Party hosting
Standard POP3 Compliant
Chat
Provide Chat rooms for various topic discussions
Provide Chat Café with background music
Allow for password protection
Web Browsing
Hot-link to other sites from portal
Track URL paths for insertion into database—(i.e.—link a song)
Browser may be tailored for TV and control by wireless keyboard and/or mouse
News Groups
Allow for the creation of vertical news groups
Allow for interactive input
Games
Provide for on-line gaming
Third-party pass-through
Data Warehouse Interface/Reporting The portal may interface to third party databases for access to media assets. In this case, the portal replicates aspects of the remote databases. These media assets are locally cached by the portal for most commonly requested assets. In addition, the portal generates essential usage reports.

Advertisement Server

The portal includes advertisement server software functionality to allow for third-party advertisement submission, deletion and maintenance. The portal automatically inserts an ad into download stream, and selects an advertisement based on user profile information when allowable. Advertisement usage and user profile information is continuously tracked. The portal generates detailed usage reports for the operator of the system as well as for the advertiser. The advertisements may include URL "hotlinks" within an advertisement window, as is well known in the art. In addition, the portal allows for personalized/customized advertisement generation.

Personalization Engine

The portal further includes personalization software that provides personalized views for users. This further allows for insertion of targeted advertising based on profiles. An example of a type of profile that is created and tracked is a user's "psychographic" profile. Suggestions are generated for users based on viewing and listening profile information.

Activity Analysis

The portal monitors activity and usage of the system to suggest patterns for load management.

The Media Player Device

Referring again to FIG. 3, one form of the media player device 200 comprises a hardware platform 250, an operating system 260, a database client application 270 and a media player engine software application 280. The media player engine 280 is, for example, based on a software platform that is useful across multiple and diverse types of hardware platforms of media player device, such as Java, or is written as a platform specific application. The media player engine 280 may include interfaces to third party software for certain functions and features. The media library database server application 330 and the database client application 270 are, for example, database software products licensed by Oracle Corp. Briefly, the media player engine 280 comprises software, such as Java and C++code for playing back audio and video assets on an operating system platform 260. The operating system 260 may be Windows, Macintosh, Linux or other operating platforms, which may include Internet browser capability or interfaces to a resident Internet browser application. Some or all of the media player engine 280 may be based on a platform portability software, such as Java.

Another form of a media player device is also shown in FIG. 3, wherein the media player device does not include a client database application 270. Instead, the master media library database 330 of the portal maintains an "on-line" database of assets to which the user of that media player device is entitled to use. The user is informed of those assets in this on-line database when the media player device connects to the portal. The functionality of the media player device without the client database application 270 is otherwise similar to a device with it, except that the device without it must connect to the portal to inform the user of his/her database contents. The media player device of this type may have some local memory in which a playlist of media assets can be stored. The locally stored playlist would contain a subset of the user's complete on-line database.

Figure 5:
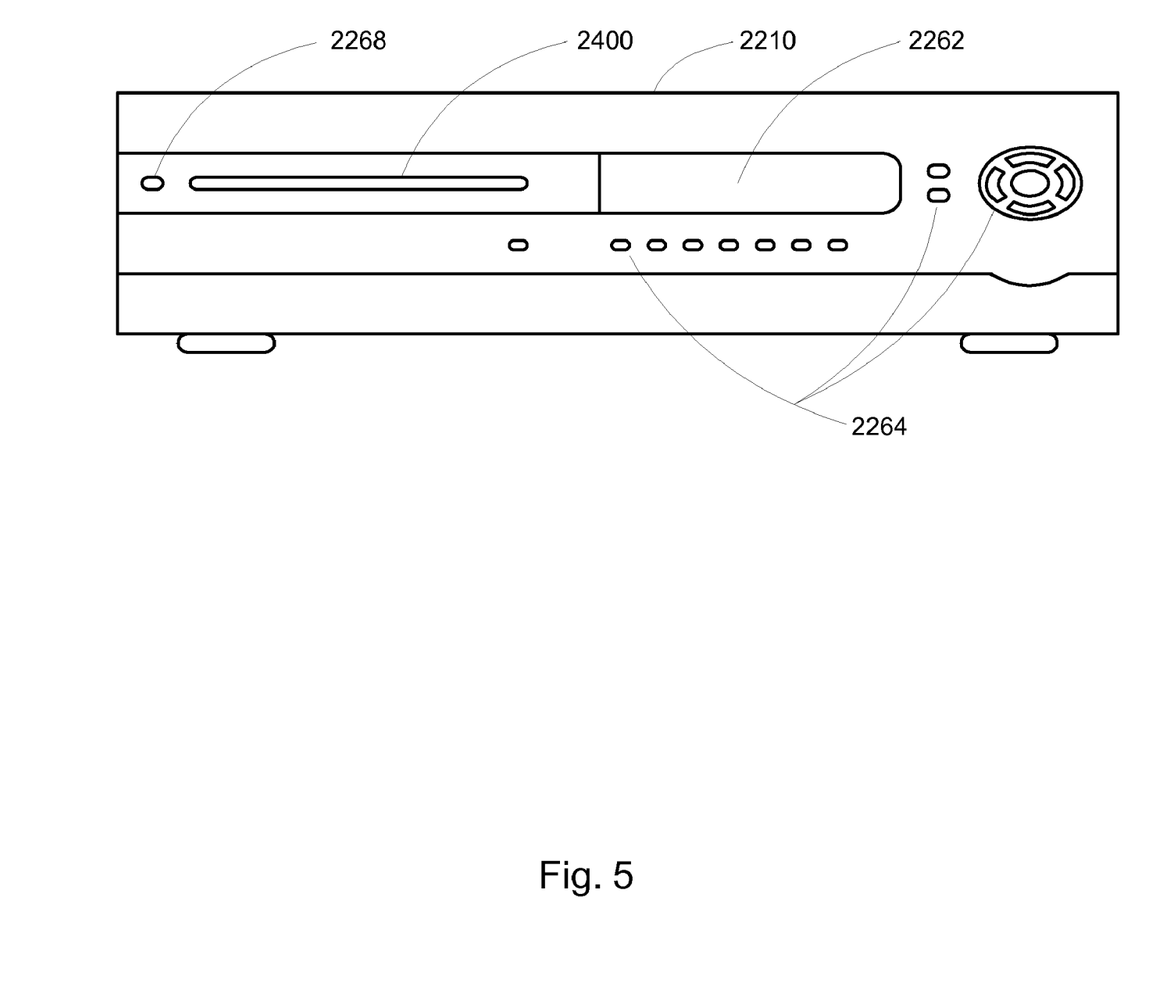
FIG. 5 is a view of a front panel of a media player device.
Figure 6:
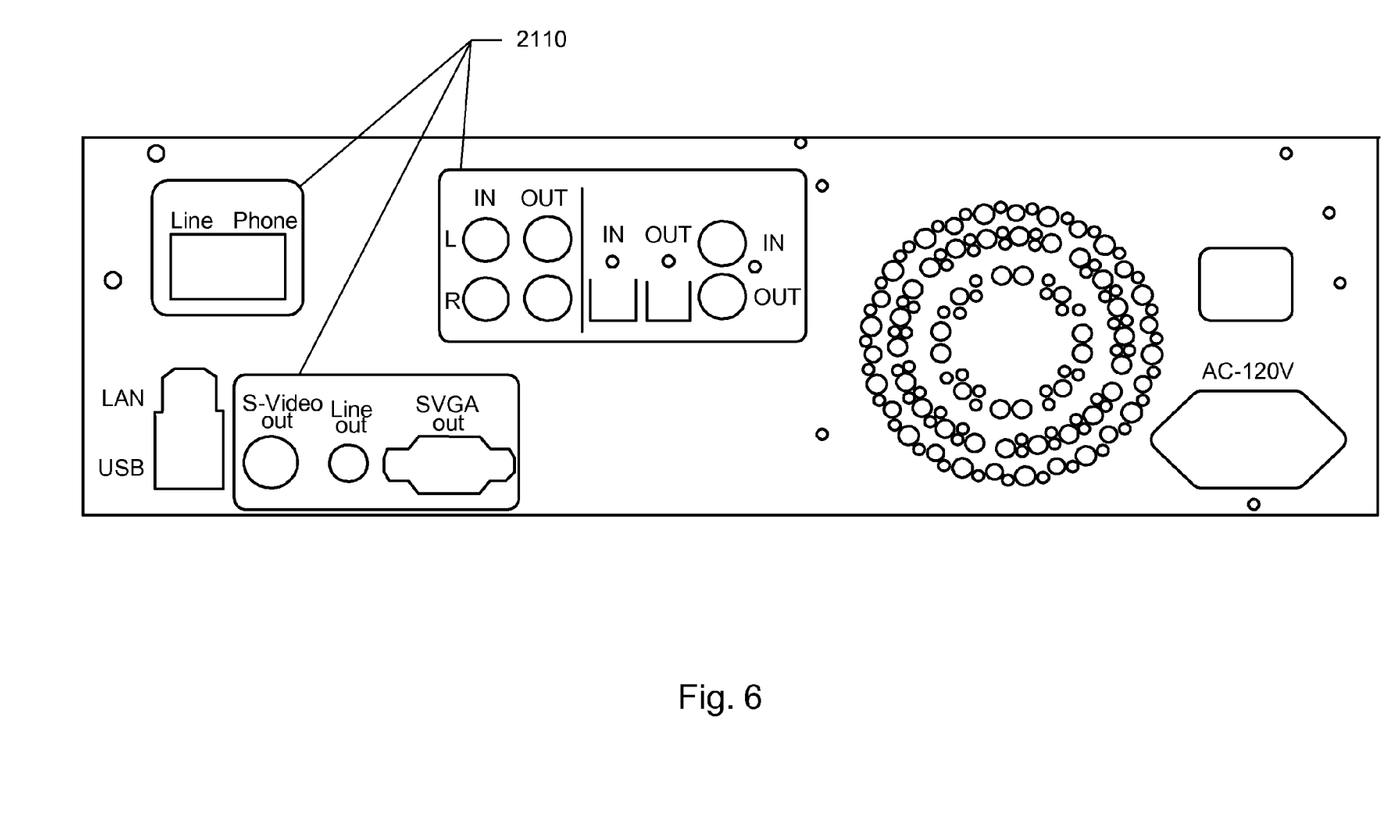
FIG. 6 is a view of a back panel of a media player device.
Figure 7:
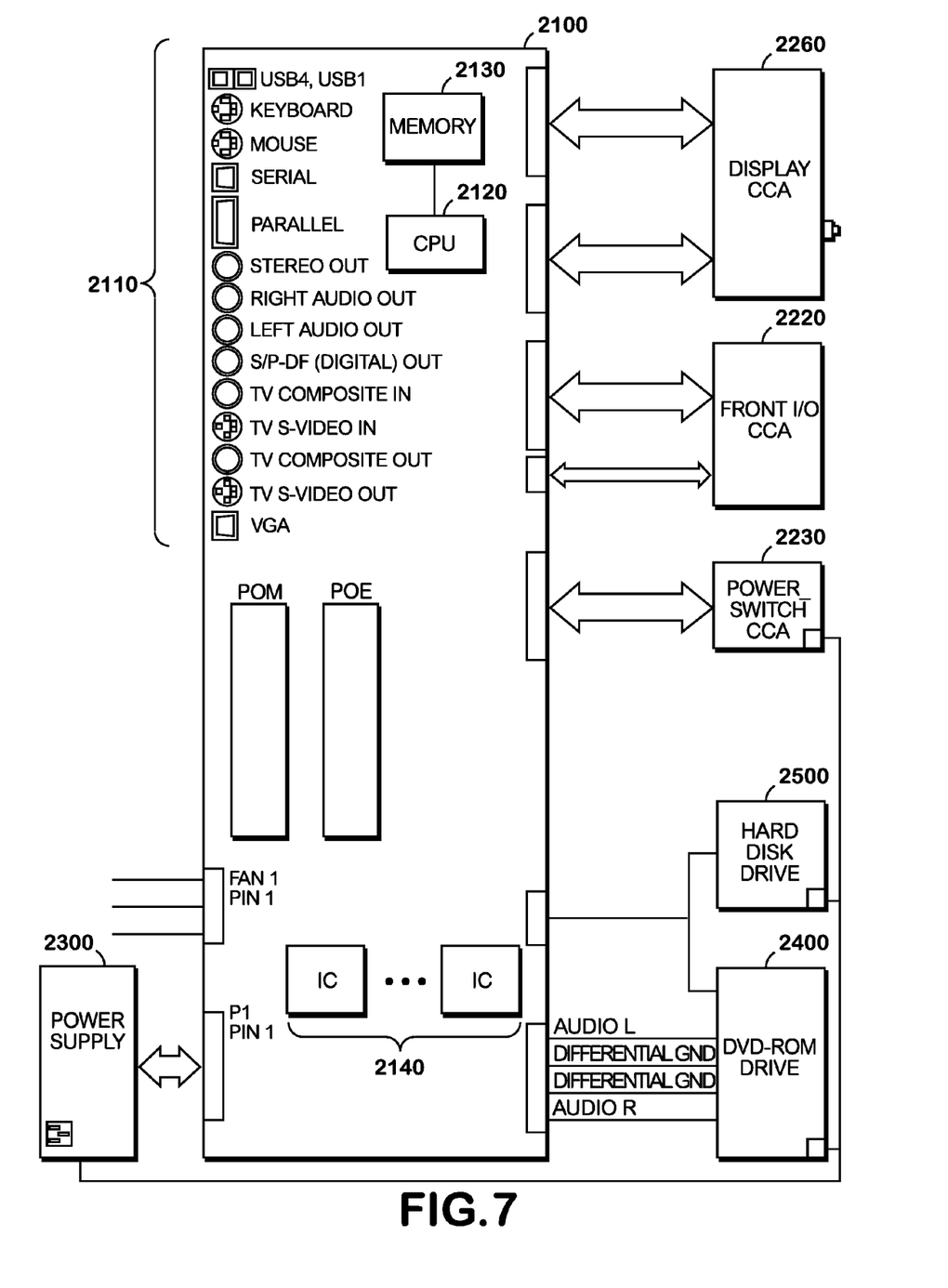
FIG. 7 is a block diagram of a media player device.

Referring now to FIGS. 5-7, an example of a hardware platform 250 for a media player device 200 of the home consumer variety 210 will be described in further detail. Many of the hardware components shown in FIGS. 5-7 would also be present in other types of media player devices (such as those shown in FIG. 1) depending on cost and feature requirements. In some cases, additional components such as an amplifier, speaker and display would be included as part of the media player hardware platform Generally, the media player device 210 is a stand-alone multimedia server. It is intended to be roughly the size of a CD/DVD Player and provide for both audio and video output, though its size may vary with specific applications. The audio output may require an amplifier to drive speakers, or an amplifier may be included within the device. Video is directed to a television or monitor. The media player device receives its media assets via broadband demand download or stream, traditional phone line download or stream from the portal and/or other media partners. The media player device is also able to download content and information from other Internet web sites through its embedded browser interface. Moreover, the media player device can playback locally stored media assets such as CDs, DVDs, or other physical media as well as media assets stored on a local hard drive storage device. The particular hardware platform 250 for a media player device 200 shown in FIGS. 5-7 is intended to complement the existing stereo and audio-visual components within the home environment. The video interface of the media player device may support NTSC and PAL analog video signal standards, as well as HDTV or other digital TV standards. In addition, the media player device can support various audio signal formats, such as Dolby and DTS theater sound formats.

The hardware platform 250 comprises several major components and assemblies.

A Front Panel Assembly 2210 comprises a display circuit assembly 2260 that drives a display 2262 and generates control signals from user input buttons 2264 and from an infrared receiver 2264; a front I/O circuit assembly 2220 and a power switch circuit assembly 2230. The display is, for example, a vacuum fluorescent display.

A Power Supply Assembly 2300 connects to a standard household power outlet and generates all of the necessary voltages and grounds for the components of the media player device.

A removable memory media drive device, such as DVD-ROM drive assembly 2400, or other suitable removable memory media drive device heretofore known or hereinafter developed is provided. The "DVD format is an example of a suitable drive assembly. Others removable memory media drive devices are CD-read, CD-read/write, DVD audio, DVD read/write, etc.

In addition, a hard disk drive 2500 is provided for storing media content and other information.

As shown in FIG. 5, the front panel comprises the display 2262, user interface buttons 2264, a power on/off switch 2268, and the tray or slot for the removable memory media drive 2400. In addition, a swing-open door reveals (not shown) USB type 'A' stacked ports, IEEE-1394 port, PC-Card ports, Smart Card port, and ¼" headphone audio jack with headphone volume adjustment knob.

The rear panel is show in FIG. 6. The rear panel exposes the I/O connections 2110, including, USB, LAN, PHONE LINE IN, SERIAL, VGA OUT, Composite Video IN, S-Video IN, Audio OUT Left, Audio OUT Right, Composite Video OUT, S-Video OUT, Digital Audio, AC ~120V.

As shown in FIG. 7, a motherboard assembly 2100 comprises the CPU 2120, memory 2130, special purpose chip sets 2140, and I/O connectors 2110. All processing excluding a processor on the display circuit assembly 2260 is controlled by the motherboard. Examples of the special purpose chip sets 2140 are Integrated Video Chipset with NTSC/PAL, S-Video, and SVGA out, Macrovision CSS for NTSC/PAL and S-Video Out, Integrated Stereo Audio Chipset with Stereo Line out, Integrated DVD/MPEG Video decoder hardware, Integrated DVD/MPEG Audio decoder hardware, 10Base-T Ethernet, 56 Kb V.90 modem, USB hardware to support 2 Type 'A' ports on rear, USB hardware to support 2 Type 'A' ports on front, IEEE-1394 hardware to support one front port, hardware to support 1 internal serial port (header), hardware to support 2 IDE drive ports (2 headers, 4 devices total).

The display circuit assembly 2260 includes firmware to perform functions such as, de-bouncing momentary switches, reporting user-input switch contact and release to motherboard via COM port, reporting removable memory media device 'EJECT' switch signal to motherboard via COM port, routing remote control and/or wireless keyboard commands to the motherboard, and managing the display.

The front panel circuit assembly 2220 manages interactions with the headphone jack, headphone volume attenuator control, dual type 'A' USB ports, and an IEEE-1394 connector. The remote control 214 (FIG. 1) has several buttons and examples of 20 some of their associated functions are listed in the table provide in the parent application which is incorporated herein by reference.

Figure 8:
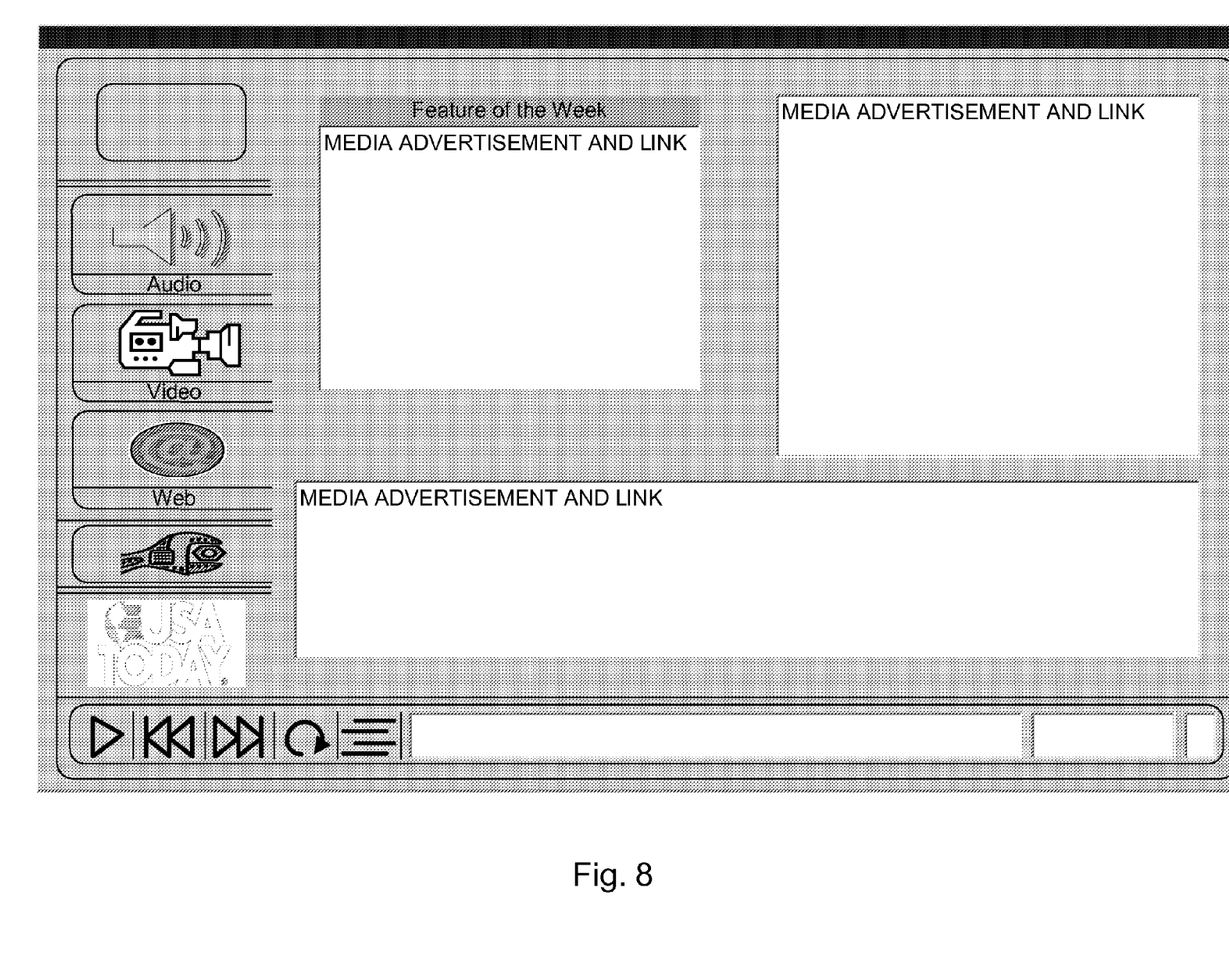
FIG. 8 is an example of a user interface screen for the media player software application.

The media player software engine provides the media playback functionality for the media player device. An example of the user interface provided by the media player software engine is shown in FIG. 8. There are icons associated with audio, video and web resources as well as one or more areas dedicated to advertisements and links. In addition, at the bottom of FIG. 8 are shown icons associated with the basic playback functions of a media asset, such as audio or video. There are several modes of operation that are controlled by the media player software engine described below. It should be understood that the media player software engine allows multiple modes to be performed at the same time. For example, a user, while using a media asset, may perform other functions such as web browsing or organizing a media asset library, etc.

Local Playback Mode

In this mode, the media player engine lays assets that reside on locally internal hard drives, CD, DVD, floppy or other removable media. Music is played back in this configuration as a background task. Other applications can function in the foreground.

Network Playback Mode

In this mode, the media player device is connected to a networked server or a mounted hard drive on a computer, which is on its local network. A media player device is capable of playing media assets in this mode from any connected server. Other media player devices can access server data. Server data is only "referenced" by the media player software engine and not "managed," i.e., data can be removed by any network member with appropriate privileges.

Internet Streaming Mode

In this mode, the media player device interacts with an Internet-based source for music or video, such as the portal or other sites capable of streaming audio or video data.

The media player device is capable of adding URL reference to its playlist. Streaming data formats include MP3, EPAC, Windows Media Audio and Video, Flash, QuickTime and REAL audio and REAL video.

Streaming Channels

The media player presents the user with a mix of preset streaming channels. The user can edit this list of channels and add or delete files to the list. These streaming channels can be either digital radio channels or streaming video channels.

Navigate Streams

This feature provides the ability to rewind and restart streaming media. The media player provides the functionality by caching the datastream in memory or on disk for later playback.

Audio Playback

This feature provides core functionality to the media player. Several formats are supported along with the standard VCR type of controls.

Typical formats are:

MP3 Audio—Various bit rates

LUCENT EPAC—Various bit rates

WAV

Macintosh Audio Format

REAL

Windows Media Player

Video Playback

Digital video can be played back in a small window or full screen. The playback window is resizable for user preference. Examples of digital video formats are, MPEG 1, 2 & 4, and QuickTime formats on Windows and Macintosh.

Integrated Internet Browser

From within the media player a user can access various Internet sites and download music and video assets. Alternately, a user can access secure items from the 25 portal that integrate into the user's virtual media asset library.

CD Playback and Record

Standard CDs can be played and recorded on the media player device.

Features include:

Listen while record.

Security restrictions for upload to portal.

Record to MP3 or other proprietary or non-proprietary format.

CD's title is automatically identified from an identification database that is either local to the portal or is remotely accessed by the portal via the Internet.

Maintain local CD recognition database of personal CD names, titles, tracks and other information.

Lyrics can be automatically added as MetaData from various servers (local or remote) that provide lyric information.

Store CD information in local database.

Maintain CD library catalog in database.

PEG, BMP & PICT album covers can be associated.

Full CD control functionality.

Similar functions can be provided for DVD and Video CD playback.

CD Recognition

This feature involves automatically accessing a local table or an Internet service that associates title and track information to CDs. The media player device automatically identifies a disc in the device. CD information is incorporated into client database in media player device and displayed during playback of the media asset.

MetaData Database

Any music or video file in the media player can have an extensive database of MetaData referenced to it. This data can be referenced in many views and may include images, lyrics, notes, rights restrictions, and URLs. All data is searchable and reportable and is incorporated into client database of media player device.

Playback Construction

A user may create a playlist manually from a master database or generate playlists randomly based on database searches. Advanced hierarchical views provided for extreme flexibility.

Features include:

View as text list, small icon or large icon views.

Drag & drop building.

Compute total playing time for making CDs timed list for events.

Loop playlist.

Play with scan mode to listen to "x" seconds of a song or video.

Data is incorporated into client database of media player device.

The Virtual Media Asset Library

The client database application of the media player can replicate its database list to the portal for virtual asset sharing. The client database application is, for example, 8iLite Oracle or SQL database software. The client database application allows the media player user to access files stored at the portal in his/her virtual media asset library. Additionally, merchants can elect to sell digital media asset along with the sale of, for example, a hardcopy CD or Video. This feature can provide an additional revenue stream to the record companies as well as to the CD retailers. The client database in the media player and the master media library database communicate and interact to provide automatic replication and synchronization.

The media player device contacts the portal periodically (such as daily, multiple times during the day, etc.) or on demand to synchronize its database application with that of the portal. A network protocol, such as for example XML-RPC, is used to synchronize the databases.

More specifically, each account on the portal has one or more media player devices associated with it, and one or more users associated with a given account.

Users on any media player device may have access to assets on any other media player device associated with that account or of unrelated users so long as licensing rights are tracked and managed. This system of mutual interdependency is one feature of the virtual media asset library. At the portal, a user's portion of the master media library database is referred to as his/her virtual account.

When an asset or its metadata is added, modified or deleted from a media player device, this change is replicated to the portal in the synchronization process.

Figure 9:
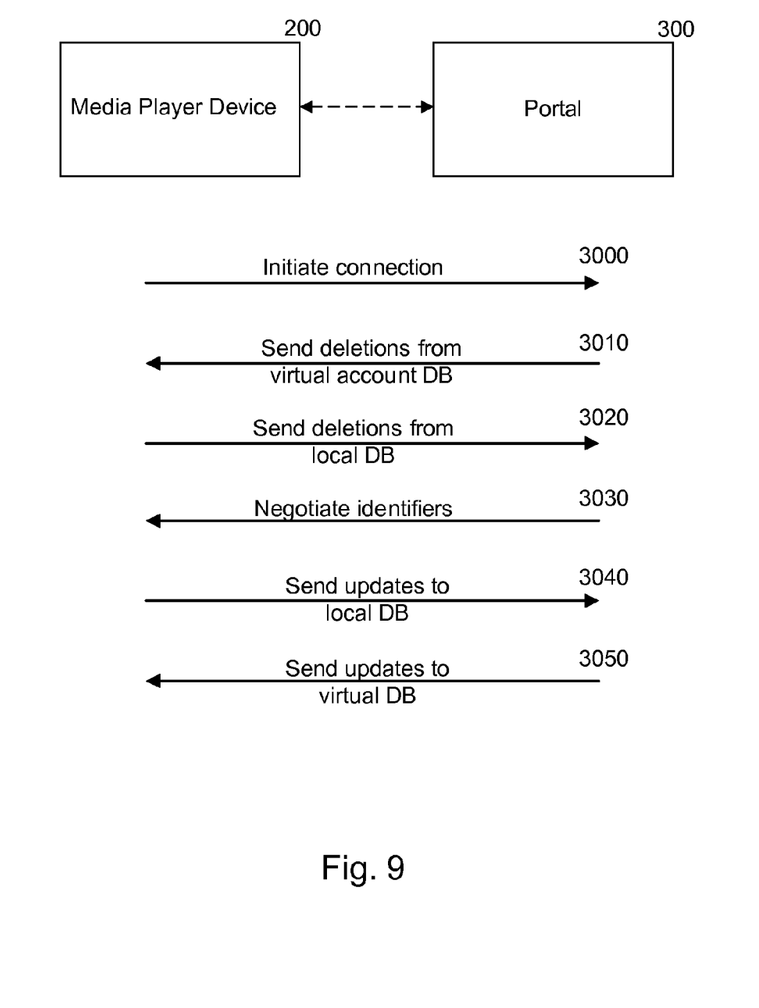
FIG. 9 is a flow chart that illustrates a synchronization process of media assets between a media player device and the portal.

The client media player device initiates synchronization with the portal. With reference to FIG. 9, first in step 3000, the client media player device initiates synchronization with the portal. Next, in step 3010 the portal forwards any asset deletions from the corresponding virtual account in the master library database to the client media player device. In step 3020, the client media player device sends any asset deletions from the local database to the portal. In step 3030, the client media player device negotiates identifiers for new media assets with the portal. In step 3040, the client media player device sends all updates of the local database (additions and changes) to the portal. In step 3050, the portal sends all updates of the corresponding virtual account in the master library database (additions and changes) to the client media player device.

Operation of the System

An example of how the system operates to distribute digital media assets from a media source 100 to a media player 200 is now described with reference to FIGS. 1-3. Initially, a user becomes a member or subscriber to a portal 300, at which time his or her identity is initialized, and he/she is issued a user-specific password. Once a membership exists, a virtual private media asset database is created and associated with the user's login account and password in the portal. The user's virtual media asset library represents an intersection of the media assets in the master media library database 330 and those assets that the user has licensed rights to. The synchronization process is described above. The master media library database 330 need not locally store all of the media assets; in some cases the master media library database 330 will maintain a reference to the media asset that is stored by a media source 100 and accessed by the portal 300 as needed to satisfy the needs of users.

The portal 300 may distribute digital media assets, that is download them in their entirety, to a client media player device for use on that device subject to the licensing rights associated therewith. Alternatively, the portal 300 may stream the digital media assets to a client media player. A user's rights with respect to the digital media is either limited term, non-exclusive licensing rights (similar, for example, to a two-day movie rental in the bricks and mortar world) or indefinite term, non-exclusive licensing rights (similar, for example, to a CD purchase in the bricks and mortar world). The portal applies a series of rights management rules associated with each user's tagged digital media assets to limit the user's access to and use to those periods to which the user's licensed rights of those assets applies. Depending upon the specific licensing arrangement between a digital media asset owner and the user, the rights management rules can provide for a limited number of plays or uses of a particular asset, a limited number of days during which the asset can be used, or a limited number of other individuals with which the user may share the asset.

The system according to the present invention permits users to download their licensed digital media assets to secure client media player devices and to use their licensed digital media assets on those devices. As with the physical use of a CD in the bricks and mortar world, a user will have access to use his or her licensed assets on other infotainment devices that he or she owns or uses, provided those other client media player devices are registered within the portal as being authorized to use the user's licensed assets.

It has been recognized that the media industry has mandated that distribution of artists' intellectual property must be protected from piracy in order for the industry to adopt Internet-based distribution methods. The system and method of the present invention optionally allow for security against asset piracy by one or more methods: watermarking, encryption, and object encapsulation. Moreover, as discussed above, the system includes rights management information to allow for use based on pre-negotiated rules.

A digital media asset may be encrypted for general protection when the asset is first entered as an object within the main library database server. Upon the request for download (or streaming access) by a user, the asset may be watermarked to coincide with the serial number of the user's family of client media player devices. Each client media player device that the user owns becomes a licensed playback device for his or her registered multimedia assets if the scope of that license so permits. For example, if a user owns five client media player devices capable of running the playback engine, the user will have access to those assets from one client media player device to another in seamless fashion. This example illustrates a capability of the system of the present invention to move or copy an asset from any home, car, portable, computer, or other computing device. Each client media player device has a stored protection key that is capable of decrypting and executing the object that has been downloaded to the player. Each client media player device key is unique, but will have some level of identity with the other client media player devices used by the user's family of devices. From an auditing and security standpoint, each client media player device maintains a log of its playback or use activity for purposes of reconciliation with the media library database server application. From the point of download of the asset forward, the asset will be associated with and licensed to the user's family of client media player devices. Furthermore, with the permission of a digital media asset owner or licensor, a user may be granted the right to loan or forward his or her licensed media assets to another person that is not a registered user of the system. The forwarded asset is encapsulated in an executable file that allows for the object's integration into the recipient's media players, provided the players are compatible with the media player technology of the system. If compatibility exists, the recipient will have the executable rights associated with this object. That is to say that if the rights of the object include an ability to play the asset only once, then the asset will play or be used once, and further actions will be disabled. In the event that compatibility does not exist or the recipient's device does not have a media player, the object will prompt for the optional download of a media player engine software application. In addition, the object will offer the possibility of membership to the system to allow for the recipient's use of this asset, as well as the recipient's possible downloading and use of other digital media assets.

If a user has previously purchased a physical media asset, the system allows for the introduction of that asset ownership into the database of the portal, in addition to the normal use of the asset in the media player device. An asset stored locally on a media player (on hard drive or other memory media such as CD or DVD) can be identified and uploaded to the portal for use on other authorized media player devices of that user. For example, a user may "rip" a CD or DVD into digital files that can be uploaded to the portal. As another example, the user presents his/her physical media asset (such as a CD) to a conversion operator (e.g., at a retail music store) who: (1) defaces the user's asset in a minimal fashion (which does not affect is usability) to ensure against improper conversion of the asset by another person; and (2) simultaneously registers the asset with the portal. This registration process establishes an ownership reference for the user with the media library database server and adds the converted asset to the user's virtual media asset library. Once this media asset has been added, the user or any user within the user's family will have access rights to the asset based on the rights conferred at the time of conversion. The rights associated with each such asset could possibly be different based on the original content creator's license.

Figure 10:
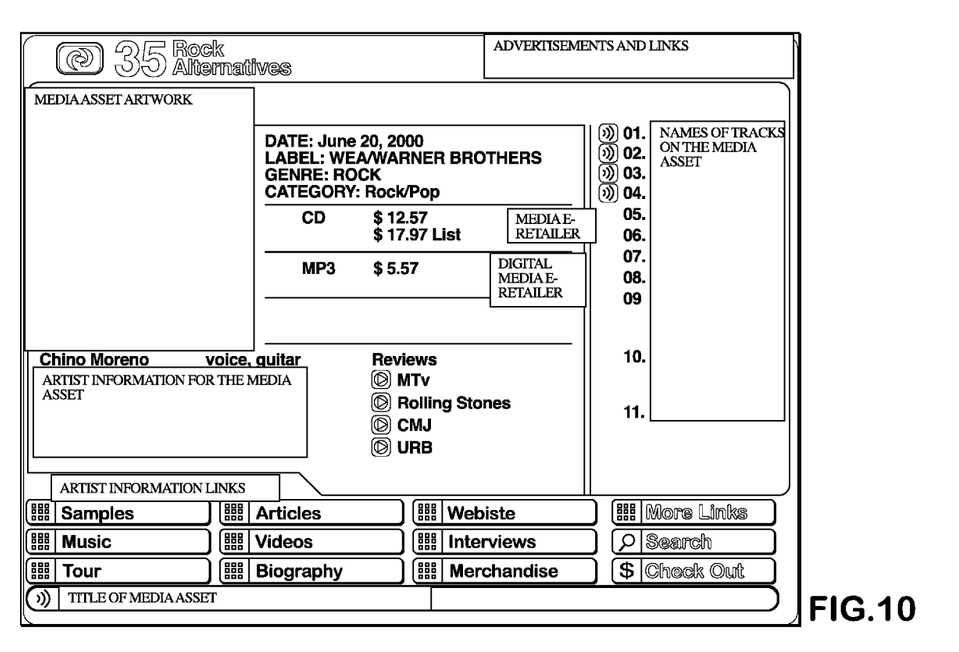
FIG. 10 is an example of a world wide web page showing how rights to a media asset may be purchased over the Internet according to the present invention.

With reference to FIG. 10, according to a further aspect of the invention, a method or model is provided both to satisfy the music industry's piracy concerns and to provide an entirely new revenue source for the industry. This business model (distribution method) allows the consumer to purchase on-line virtual access rights with respect to each one of a consumer's purchased physical media assets. That is to say that a consumer who is a user of the system according to the invention can, for an appropriate fee, access each of his or her media assets anytime and anywhere the consumer has an Internet-enabled client media player device. This method assumes for the music industry, for example, that consumers will continue to purchase physical media music assets, but will have the option of paying an additional licensing fee ($5.57, for example) for on-line virtual access rights to those music assets. FIG. 10 shows an example by which a user, through the portal, orders an audio CD from a media e-retailer, and is given the option to purchase digital access rights from a digital media e-retailer. The additional licensing fee per digital media asset is shared with the portal operator, participating e-retailers, and media asset (music) content owners. In exchange for the additional licensing fee, a "tag" would be associated with those digital media assets on the master media library database server with a notation that a particular user's media player devices are entitled to play or usage rights for those digital media assets.

It is further envisioned that each user may have up to some maximum number of eligible client media player devices (e.g., a desktop computer at home, a notebook personal computer at work, a DVD set top box, a vehicle-based device, and a handheld portable device), for which user will pay the system operator a monthly membership fee in order to have on-line virtual access services during any particular month. Consumers will find value in the automatic synchronization of the contents of their various media players, which allows them to gain access to all of their media assets from any player at any time. Finally, users may, subject to a licensing fee, convert their existing libraries of physical music assets (e.g., CDs and cassette tapes) to on-line virtually accessible assets.

Figure 11:
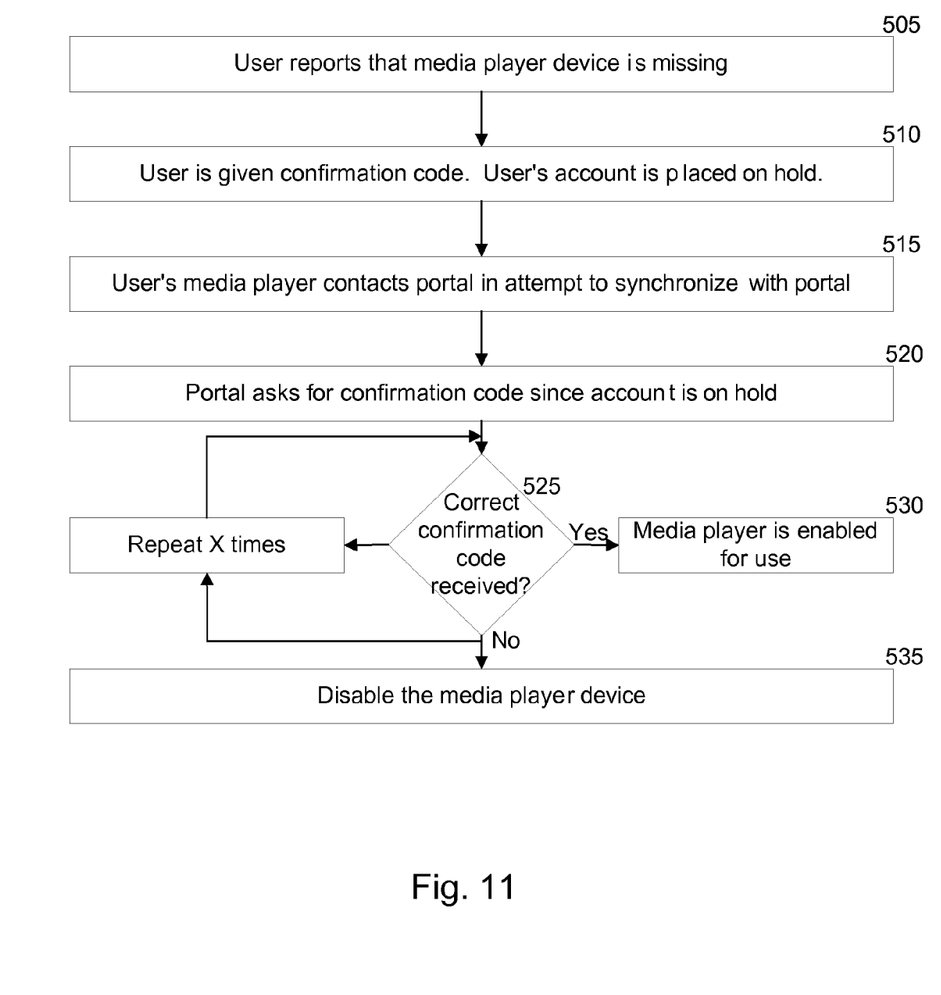
FIG. 11 is a flow chart illustrating a security lock-out feature of a media player according to an aspect of the present invention.

Referring to FIG. 11, a security lockout procedure 500 according to the invention will be described. To protect the usage of a digital media asset and a media player device, the security lockout procedure is provided to lockout unauthorized media player devices. Media player devices contact the portal for database synchronization, etc., when they are powered on, and periodically thereafter. If a media player device is stolen or missing, in step 505, a user contacts the portal (electronically via email, via telephone, etc.) and reports that the media player device is stolen or missing. In step 510, the portal puts the user's account on hold and issues the user a confirmation code. The user is then instructed to power cycle each of his/her media player devices. In step 515, the user's media players contact the portal in attempt to synchronize with the portal. Before synchronizing, in step 520, the portal will cause the media player to ask the user for the confirmation code since the user's account has been put on hold. In step 525, the portal determines whether the correct confirmation code has been received from the media player device. If it has, the media player device is enabled for use in step 530. If the correct confirmation code is not received from a user of a media player device after a certain number of attempts, that media player device is disabled and no longer usable unless completely re-enabled. The above description is intended by way of example only.

What is claimed is:

1. A method of managing access to a plurality of media assets comprising the steps of:
   providing a user with a user account;
   storing references to a plurality of media assets which the user has a license to use;
   associating a plurality of media player devices with the user account wherein the plurality of referenced media assets may be accessed by any one of the plurality of media player devices that are associated with the user account;
   accessing one of the plurality of media assets with an accessing device; and
   providing a compatible user interface to the accessing device for accessing the plurality of media assets on the media player device.

2. The method of claim 1, wherein the plurality of media assets may comprise one or more of video, audio or image formats.

3. The method of claim 1, wherein the plurality of media player devices may comprise one or more of a laptop computer, personal computer, portable media device, mobile communications device, personal digital assistant, cable set top box, satellite set top box, home audio component or an automobile audio device.

4. A media asset management system comprising:
   a portal comprising:
      a user account corresponding to at least one user; and
      a library storing a reference to a plurality of media assets which the user has a license to use; and
   a media player device that is operable to:
      interface with the portal and synchronize media referenced in the library of the user account with media assets stored on the media player device; and
      providing one of the media assets to a user device; and
      providing a user interface to the user device to enable the user device to playback the media asset.

5. The media asset management system of claim 4, wherein the library only contains a reference to the plurality of media assets which the user has a license to use.

6. The media asset management system of claim 4, wherein the user device connected to the media player device may comprise one or more of a laptop computer, personal computer, portable media device, mobile communications device, personal digital assistant, cable set top box, satellite set top box, home audio component or an automobile audio device.

7. The media asset management system of claim 4, wherein the media player device further includes an asset portability application that is configured to provide at least one of the plurality of media assets from one of the media player devices to another of the plurality of media player devices.

8. The media asset management system of claim 4 wherein the number of associated media player devices are limited to a maximum number.

9. The media asset management system of claim 4, wherein the user interface is dependent upon the user device type and is a graphical user interface.

10. The media asset management system of claim 4, wherein the user interface is text based user interface.

11. A method of providing access to a plurality of media assets comprising the steps of:
    providing a user with a user account;
    allowing the user to license a plurality of media assets;
    associating the licensed plurality of media assets with the user account;
    storing at least a portion of the licensed media assets on a media player device associated with the user account;
    providing a user interface to other user devices and access to at least a portion of the licensed media assets, wherein utilizing the user interface the at least a portion of the license media assets can be played back.

12. The method of claim 11, wherein the plurality of media assets may comprise one or more of video, audio or image formats.

13. The method of claim 11, wherein the plurality of media player devices may comprise one or more of a laptop computer, personal computer, portable media device, mobile communications device, personal digital assistant, cable set top box, satellite set top box, home audio component or an automobile audio device.

14. The method of claim 13, wherein the step of providing a user interface to other user devices further comprises the steps of providing a user interface compatible with the detected device type.

15. The method of claim 11, wherein the other user device may comprise one or more of a laptop computer, personal computer, portable media device, mobile communications device, personal digital assistant, cable set top box, satellite set top box, home audio component or an automobile audio device.

* * * * *